United States Patent Office 2,771,483
Patented Nov. 20, 1956

2,771,483

METHOD OF PREPARING ALKYL ISOCYANATES FROM INORGANIC CYANATES

Theodore I. Bieber, Kew Gardens, N. Y.

No Drawing. Application August 12, 1953,
Serial No. 373,887

6 Claims. (Cl. 260—453)

The present invention relates to a method of preparing alkyl isocyanates from inorganic cyanates and, more particularly, it relates to a process of preparing alkyl isocyanates by reacting trialkyl phosphates with alkali metal cyanates.

In the past, alkyl isocyanates have been prepared from alkali metal cyanates but always with unsatisfactory results. For example, ethyl isocyanate has been prepared by reacting potassium cyanate with ethyl sulfate. However, this process has several disadvantages. First, the resulting ethyl isocyanate has a tendency to polymerize. This polymerization is believed due to the presence of sulfur dioxide which results from the decomposition of ethyl sulfate at the reacting temperature. Secondly, the reaction is rather violent and difficultly controllable so that it requires a moderator such as sodium carbonate. These disadvantages are typical of those experienced with the known processes.

I have found that alkyl isocyanates such as ethyl isocyanate may be readily and easily produced without such disadvantages, however, by reacting the trialkyl phosphates with alkali metal cyanates. In addition, my process gives very satisfactory yields of the alkyl isocyanates.

Accordingly, it is an object of the present invention to provide a process of producing an alkyl isocyanate by reacting trialkyl phosphate with an alkali metal cyanate.

It is a further object of the current invention to provide a method as above described which gives a satisfactory yield of alkyl isocyanate.

Another object of the present invention is to provide a process as described above wherein the alkyl isocyanate produced will not polymerize due to the presence of compounds formed during the reaction.

A still further object is to provide a process as described above wherein metal dialkyl phosphates are produced in satisfactory yield as by-products.

Another object of the present invention is to provide a process as described above which has a nonviolent character and is easy to control.

Other objects and advantages of the present invention will become more apparent as it is described in detail below.

In accord with my invention I have found that a trialkyl phosphate is capable of alkylating the alkali metal cyanates so as to produce an alkyl isocyanate. This reaction may be represented by the following general equation $$(RO)_3PO + M \cdot OCN = RNCO + (RO)_2PO_2M$$

where R is an alkyl group containing from 1–8 carbon atoms and M is an alkali metal atom. The alkylation occurs at elevated temperatures of around 200° C. The resulting alkyl isocyanate is distilled out of the reaction mixture along with some trialkyl phosphate. Since the trialkyl phosphate has a considerably higher boiling point than the alkyl isocyanate, it is readily separated therefrom by fractional distillation.

It is to be noted that alkali metal dialkyl phosphates are also produced in this reaction. The best results are obtained when the reaction is performed in the presence of an excess of the trialkyl phosphate. Below are several examples illustrating my invention whereby ethyl isocyanate and butyl isocyanate are prepared.

*Example 1*

In order to prepare ethyl isocyanate, 98 g. of triethyl phosphate and 30 g. of potassium cyanate were placed in a suitable distilling flask. The mixture was strongly heated until distillation began to occur. For the next ten minutes heat was applied on and off to maintain distillation at a fairly even rate. The reaction mixture became quite viscous by the end of this time and heating was discontinued when strong white fumes due to the condensation of water vapor started to appear, the water being a result of decomposition within the viscous mass. A parallel experiment had shown that when these fumes were allowed to distill, water droplets appeared in the distillate and caused the evolution of carbon dioxide from the latter (hydrolysis of ethyl isocyanate). The viscous residue in the distilling flask set to a gel on cooling. It consisted chiefly of potassium diethyl phosphate along with some triethyl phosphate; the latter was removable e. g. by distillation at reduced pressure, whereupon the potassium diethyl phosphate solidified.

The distillate from the reaction, a mixture of ethyl isocyanate and triethyl phosphate, was subjected to distillation, and 16.5 g. of ethyl isocyanate (a 63% yield based on potassium cyanate) was collected at 60–63° C. The high-boiling liquid residue from the distillation was triethyl phosphate (16.3 g.).

An experiment employing a smaller relative amount of triethyl phosphate than used above gave a less satisfactory result, since the reaction mixture became viscous and gave rise to water vapor before much product had been collected.

*Example 2*

In order to prepare butyl isocyanate, 73 g. of tributyl phosphate and 20 g. of potassium cyanate were placed in a suitable distilling flask and heated. In this case also, when heating of the reaction mixture was continued after it had become viscous, decomposition with formation of water vapor occurred. The reaction was therefore stopped at this stage. The residue in the distilling flask, consisting chiefly of potassium dibutyl phosphate, solidified on cooling. The distillate contained butyl isocyanate and tributyl phosphate, separable by fractional distillation. After three distillations 7 g. of butyl isocyanate (a 29% yield based on potassium cyanate) boiling at 115–117° C. was obtained; reported B. P. 113–116° C.

Reaction of the butyl isocyanate prepared in this manner with p-toluidine in benzene solution yielded 1-butyl-3-(p-tolyl)-urea in very good yield, M. P. 118° C. after recrystallization from an alcohol-water mixture; reported M. P. 119° C.

While I have illustrated my invention by the above two examples, it is not to be limited thereto but may be modified within the spirit and scope thereof.

I claim:

1. The process of preparing an alkyl isocyanate by reacting at temperatures around 200° C. an alkali metal cyanate with a trialkyl phosphate having the formula $(RO)_3PO$, where R is an alkyl group having from one to eight carbon atoms therein.

2. The process of preparing an alkyl isocyanate by reacting at temperatures around 200° C. an alkali metal cyanate with a trialkyl phosphate having the formula $(RO)_3PO$, where R is an alkyl group having from one to eight carbon atoms therein, the process being carried out in an excess of trialkyl phosphate.

3. The method of preparing ethyl isocyanate by reacting triethyl phosphate with an alkali metal cyanate at temperatures of around 200° C.

4. The method of preparing butyl isocyanate by reacting tributyl phosphate with an alkali metal cyanate at temperatures of around 200° C.

5. The method of preparing ethyl isocyanate by reacting at temperatures around 200° C. triethyl phosphate with potassium cyanate.

6. The method of preparing butyl isocyanate by reacting at temperatures around 200° C. tributyl phosphate with potassium cyanate.

No references cited.